US012585969B2

(12) United States Patent
Rowe et al.

(10) Patent No.: US 12,585,969 B2
(45) Date of Patent: Mar. 24, 2026

(54) GENERATING CONFIDENCE SCORES FOR MACHINE LEARNING MODEL PREDICTIONS

(71) Applicant: Oracle International Corporation, Redwood Shores, CA (US)

(72) Inventors: Matthew Charles Rowe, Bletchley (GB); Alberto Polleri, London (GB); Rhys David Green, Cardiff (GB)

(73) Assignee: Oracle International Corporation, Redwood Shores, CA (US)

( * ) Notice: Subject to any disclaimer, the term of this patent is extended or adjusted under 35 U.S.C. 154(b) by 981 days.

(21) Appl. No.: 17/475,557

(22) Filed: Sep. 15, 2021

(65) Prior Publication Data

US 2022/0366280 A1    Nov. 17, 2022

Related U.S. Application Data

(60) Provisional application No. 63/201,521, filed on May 3, 2021.

(51) Int. Cl.
G06N 5/04 (2023.01)
G06F 18/2413 (2023.01)
G06N 5/022 (2023.01)
(52) U.S. Cl.
CPC ......... G06N 5/04 (2013.01); G06F 18/24147 (2023.01); G06N 5/022 (2013.01)
(58) Field of Classification Search
CPC .......... G06N 5/04; G06N 5/022; G06N 5/045; G06N 20/00; G06F 18/24147
See application file for complete search history.

(56) References Cited

U.S. PATENT DOCUMENTS 8,600,986 B2    12/2013  Fan et al.
2018/0330198 A1*  11/2018  Harary .................. G06V 10/44
2019/0050672 A1*  2/2019  Shang .................... G06F 16/00
(Continued)

FOREIGN PATENT DOCUMENTS

CN        112488104 A      3/2021
EP          3614313 A1     2/2020
WO   WO-2020185101 A1 *   9/2020   ............. G06F 18/22

OTHER PUBLICATIONS

Chen, Tongfei, et al. "Confidence scoring using whitebox meta-models with linear classifier probes." The 22nd International Conference on Artificial Intelligence and Statistics. PMLR, 2019. (Year: 2019).*

(Continued)

*Primary Examiner* — Kieu D Vu
*Assistant Examiner* — Humaira Zahin Mauni
(74) *Attorney, Agent, or Firm* — Invoke

(57)        ABSTRACT

Techniques for generating confidence scores for machine learning predictions are disclosed. The confidence score for a predicted label corresponding to a target data point is based at least in part on how well the machine learning model predicts labels for other data points that are similar to the target data point. The system uses k data points, closest to the target data point, with known labels to compute the confidence score of a predicted label for the target data point. The accuracy of the predictions and the distance of each of the k data points from the target data point are used to compute a confidence score for a label predicted for the target data point.

23 Claims, 7 Drawing Sheets

(56) References Cited

U.S. PATENT DOCUMENTS

| | | | | |
|---|---|---|---|---|
| 2020/0034661 | A1 | 1/2020 | Kim et al. | |
| 2020/0151547 | A1* | 5/2020 | Valpola | G06N 20/00 |
| 2020/0285940 | A1* | 9/2020 | Sprechmann | G06N 3/006 |
| 2020/0320371 | A1 | 10/2020 | Baker | |
| 2020/0334557 | A1* | 10/2020 | Kale | G06N 20/00 |
| 2022/0036203 | A1* | 2/2022 | Nachum | G06N 20/00 |

OTHER PUBLICATIONS

Ghawi, Raji, and Jurgen Pfeffer. "Efficient hyperparameter tuning with grid search for text categorization using kNN approach with BM25 similarity." Open Computer Science 9.1 (2019): 160-180. (Year: 2019).*

Pires, Catarina, et al. "Towards knowledge uncertainty estimation for open set recognition." Machine Learning and Knowledge Extraction 2.4 (2020): 505-532. (Year: 2020).*

Jiang, Heinrich, et al. "To trust or not to trust a classifier." Advances in neural information processing systems 31 (2018). (Year: 2018).*

Briesemeister, S., et al., "No Longer Confidential: Estimating the Confidence of Individual Regression Predictions," PLOS One, vol. 7, Issue 11, Nov. 15, 2012, pp. 1-9.

Jesse, Z., "Estimating confidence intervals on accuracy in classification in machine learning," University of Alaska Fairbanks, Thesis, Apr. 2009, pp. 30.

Liu, J.A., et al., "Accurate Uncertainty Estimation and Decomposition in Ensemble Learning," 33rd Conference on Neural Information Processing System, Nov. 2019, pp. 8950-8961.

Tosi, F., "Beyond local reasoning for stereo confidence estimation with deep learning," Proceedings of the European Conference on Computer Vision (ECCV), Sep. 18-14, 2018, pp. 319-334.

Bie K. D. et al., "To trust or not to trust a regressor: estimating and explaining trustworthiness of regression predictions", arxiv.org, Cornell University Library, 201 Olin Library Cornell University Ithaca, NY 14853, Jul. 28, 2021, 10 Pages.

Green et al., "MACEst: the reliable and trustworthy model agnostic confidence estimator", arxiv.org, Cornell University Library, 201 Olin Library Cornell University Ithaca, NY 14853, Sep. 2, 2021, 26 Pages.

Konig et al., "Towards algorithm-agnostic uncertainty estimation: predicting classification error in an automated machine learning setting", Proceedings of the 7th ICML workshop on Automated Machine Learning (AutoML'20), Jul. 18, 2020, 12 Pages.

* cited by examiner

100

110

Data Analysis Platform

111

112

Machine Learning Engine

Machine Learning Model

113

Confidence Value Generator

114

Confidence Value Model

120

121

Dataset

122

ML Model Training Subset

123

Graph Space Subset

124

Parameter Tuning Subset

125

Testing Subset

130

Data Application Layer

131

System Attributes

132

System Data

Controller

133

134

Applications

135

System Operations

136

User Interface

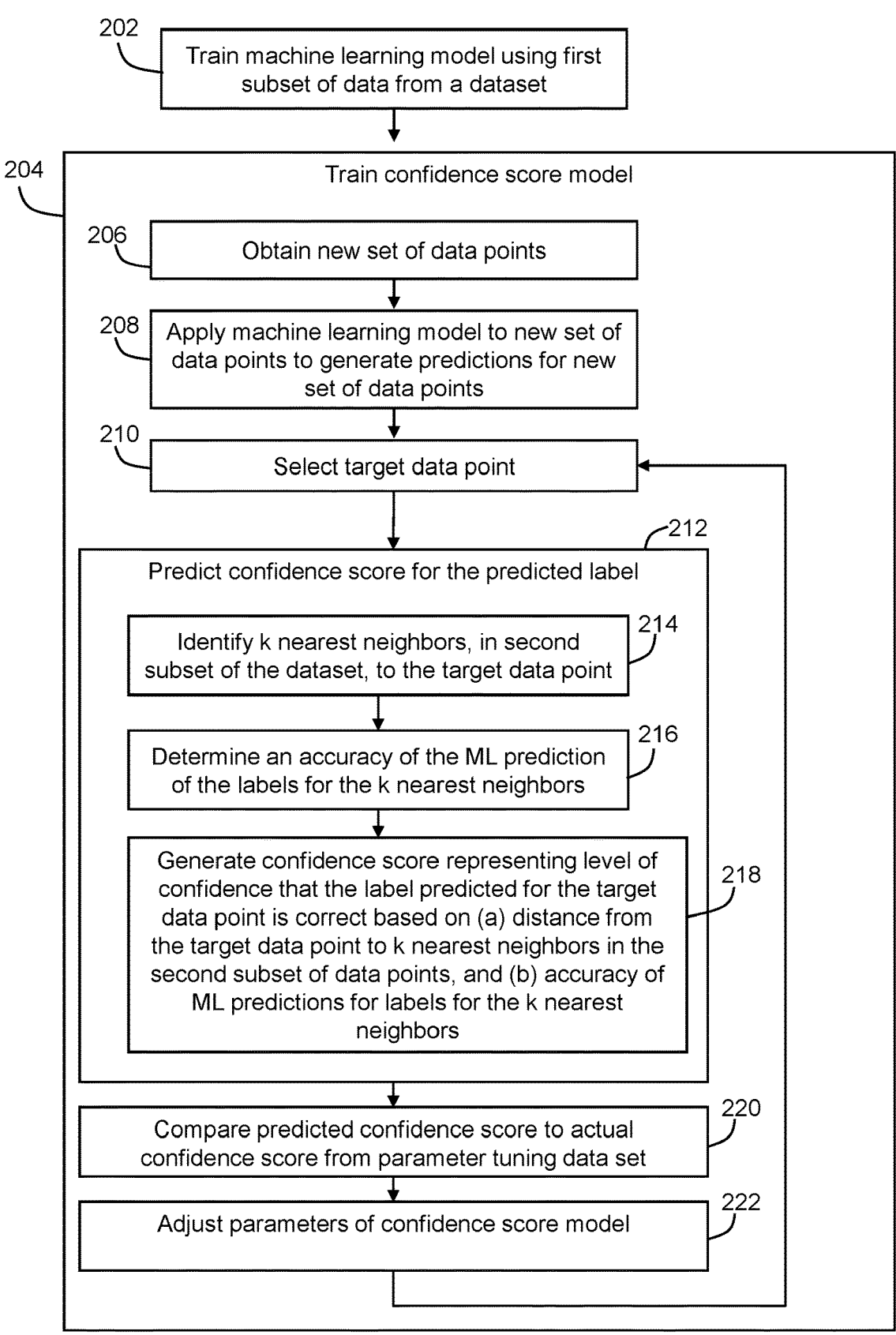

202
Train machine learning model using first subset of data from a dataset

204
Train confidence score model

206
Obtain new set of data points

208
Apply machine learning model to new set of data points to generate predictions for new set of data points 210
Select target data point 212
Predict confidence score for the predicted label 214
Identify k nearest neighbors, in second subset of the dataset, to the target data point 216
Determine an accuracy of the ML prediction of the labels for the k nearest neighbors 218
Generate confidence score representing level of confidence that the label predicted for the target data point is correct based on (a) distance from the target data point to k nearest neighbors in the second subset of data points, and (b) accuracy of ML predictions for labels for the k nearest neighbors 220
Compare predicted confidence score to actual confidence score from parameter tuning data set 222
Adjust parameters of confidence score model

Figure 2

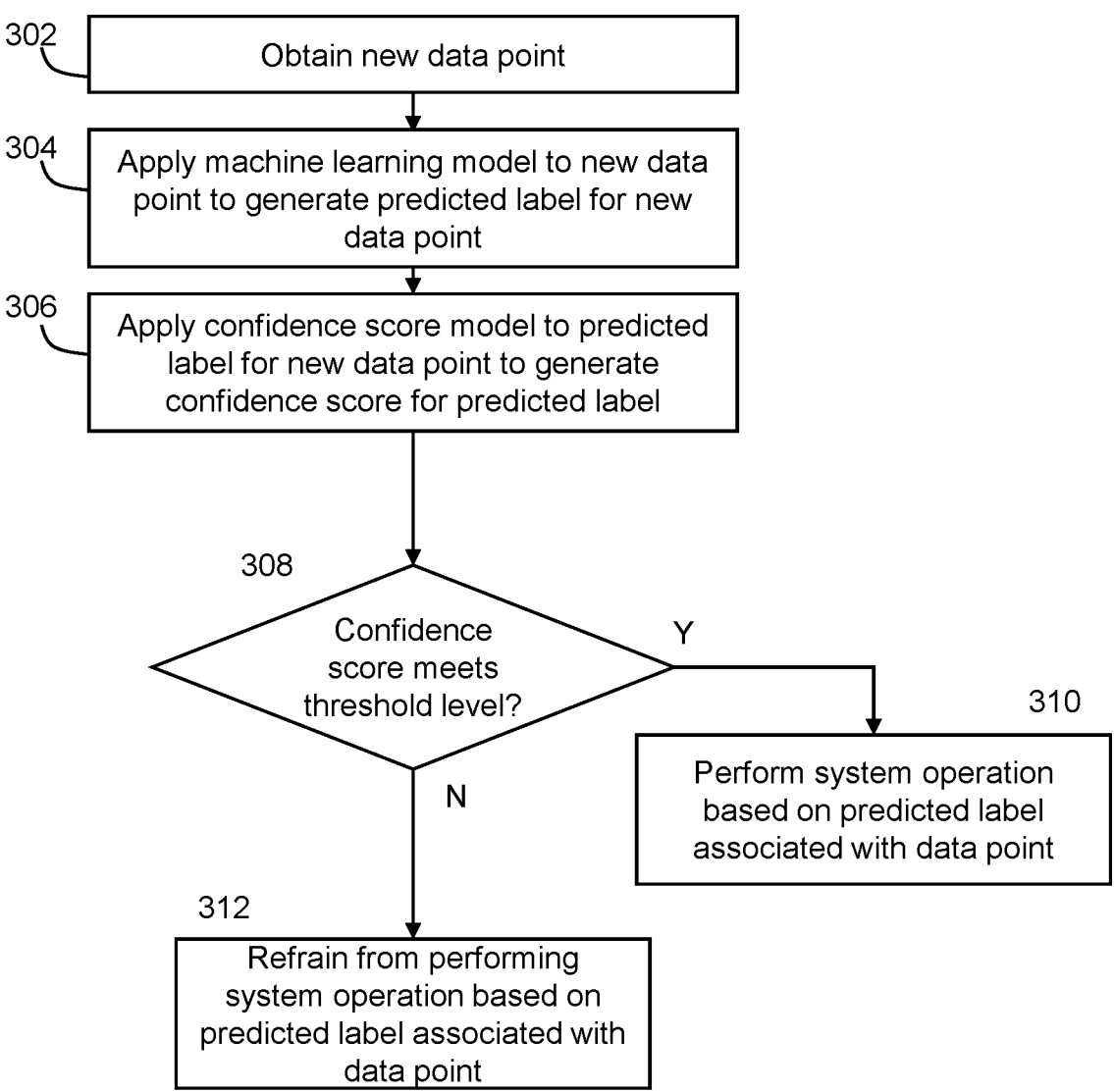

302 — Obtain new data point

304 — Apply machine learning model to new data point to generate predicted label for new data point 306 — Apply confidence score model to predicted label for new data point to generate confidence score for predicted label 308 — Confidence score meets threshold level?

Y

310 — Perform system operation based on predicted label associated with data point

N

312 — Refrain from performing system operation based on predicted label associated with data point

Figure 3

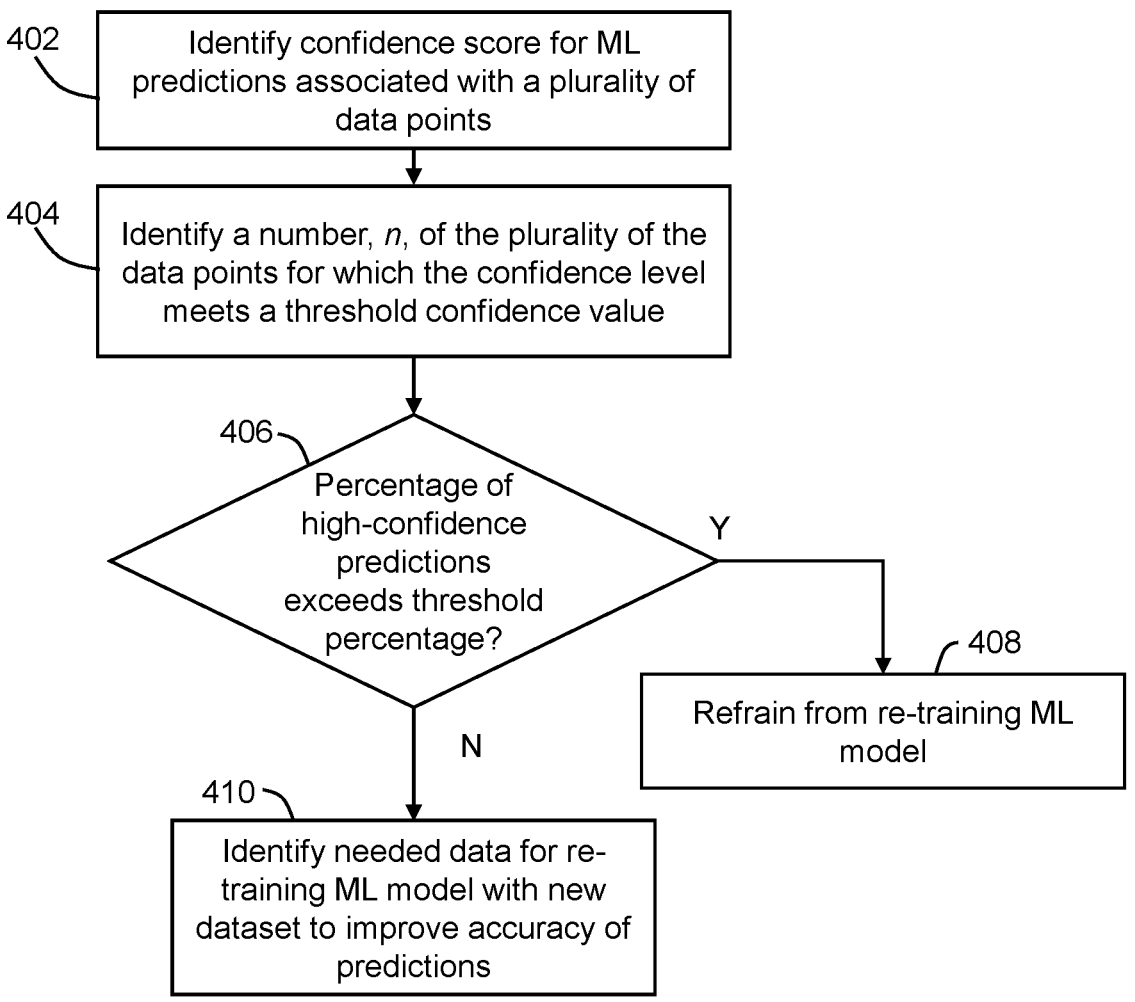

402 Identify confidence score for ML predictions associated with a plurality of data points 404 Identify a number, *n*, of the plurality of the data points for which the confidence level meets a threshold confidence value 406 Percentage of high-confidence predictions exceeds threshold percentage?

Y

408 Refrain from re-training ML model

N

410 Identify needed data for re-training ML model with new dataset to improve accuracy of predictions

Figure 4

GENERATING CONFIDENCE SCORES FOR MACHINE LEARNING MODEL PREDICTIONS

BENEFIT CLAIMS; RELATED APPLICATIONS; INCORPORATION BY REFERENCE

This application claims the benefit of U.S. Provisional Patent Application 63/201,521, filed May 3, 2021, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to generating confidence scores for machine learning model predictions. In particular, the present disclosure relates to training a confidence score model to generate confidence scores for predictions made by a machine learning model.

BACKGROUND

Machine learning models are used in a wide variety of applications—including data, voice, and image recognition, system monitoring and fault detection, and user interface automation, among others—to perform complex analysis and recognition tasks using computers. Recently, inroads have been made into identifying the accuracy of the machine learning models. However, in some fields, making a single bad prediction can have major consequences. Therefore, a global estimate of model accuracy may not be adequate for some applications. For example, any machine learning model is adversely affected by two types of uncertainty: aleatoric uncertainty and epistemic uncertainty. Aleatoric uncertainty results from noise or randomness within the dataset that is used to train the model. A prediction made by a trained machine learning model may be inaccurate due to the noise or randomness of the data used to train the model. Epistemic uncertainty results from a lack of data. A machine learning model given a data point as an input will generate a prediction regardless of whether it was trained based on similar data points. Due to the variations in predictions resulting from the aleatoric and epistemic uncertainty inherent in any machine learning model, a user relying on a prediction from a machine learning model may not be able to determine whether a particular prediction is reliable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for generating a confidence score for a machine learning prediction in accordance with one or more embodiments;

FIG. 3 illustrates an example set of operations for using confidence scores for machine learning model predictions in accordance with one or more embodiments;

FIG. 4 illustrates an example set of operations for using confidence scores to trigger a re-training of a machine learning model in accordance with one or more embodiments;

DETAILED DESCRIPTION

Figure 1:
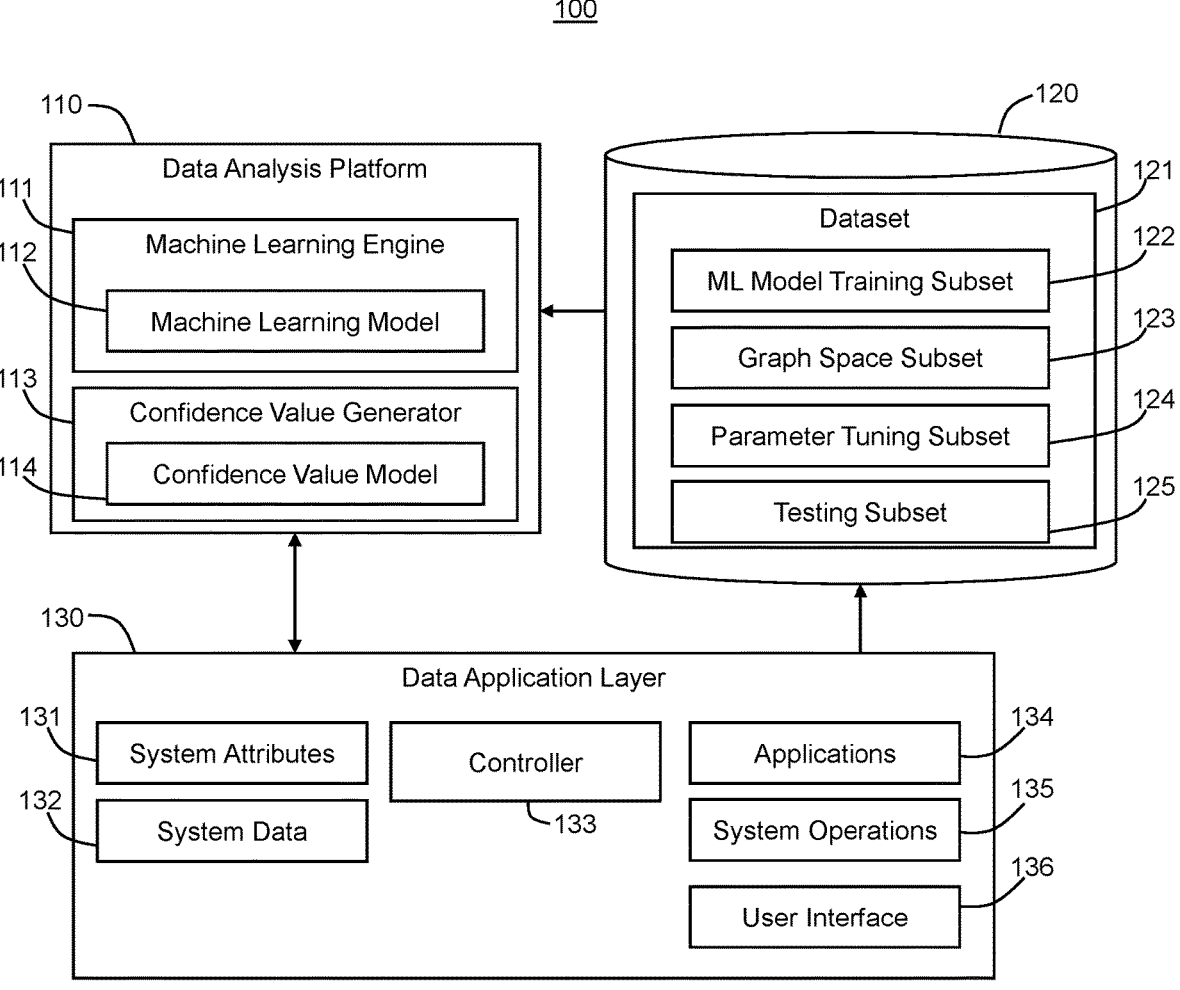
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. TRAINING A CONFIDENCE SCORE MODEL TO GENERATE CONFIDENCE SCORES FOR MACHINE LEARNING MODEL PREDICTIONS
3.1 USING GENERATED CONFIDENCE VALUES TO MODIFY SYSTEM OPERATIONS
3.2 USING GENERATED CONFIDENCE VALUES TO TRIGGER RE-TRAINING OF MODEL
4. COMPUTER NETWORKS AND CLOUD NETWORKS
5. MISCELLANEOUS; EXTENSIONS
6. HARDWARE OVERVIEW

1. General Overview

Machine learning models are trained to predict labels for input data points. For example, one machine learning model may receive an image as an input and generate a label identifying an object in the image as a "person." Another machine learning model may receive system sensor data as an input and predict a label "success" or a label "failure" based on the system sensor data.

One or more embodiments generate a confidence score for a prediction generated by a machine learning model to quantify the likelihood that the prediction is accurate. A machine learning model is applied to a target data point to generate a classification, in the form of a label, for the target data point. The confidence score for a predicted label corresponding to a target data point is based at least in part on how well the machine learning model predicts labels for other data points that are similar to the target data point. The similar data points in a multidimensional space may be identified as a function of the Euclidian distance to the target data point. As an example, the system uses k data points, closest to the target data point, with known labels to compute the confidence score of a predicted label for the target data point. Specifically, the labels predicted by the machine learning model for the k data points are compared to the known labels for the k data points to determine whether the machine learning model correctly or incorrectly predicted the labels for the k data points. The accuracy of the predictions and the distance of each of the k data points from the target data point are used to compute a confidence score for a label predicted for the target data point.

In one embodiment, the system applies a weight to the accuracy measures for the k closest neighbors, where k is a pre-defined number, to a data point based on the distance from the data point to the k closest neighbors. In another embodiment, the system computes the confidence score by applying weights to each of k closest neighbors within a threshold distance from the data point. In other words, the number of closest neighbors, k, may vary according to the number of data points within a threshold distance from the data point for which the confidence score is being calculated.

In one embodiment, the distance from a data point to its k nearest neighbors is calculated based on a Euclidian distance between the data point and each of the k nearest neighbors. Alternatively, a system computes a Euclidian distance based on a reduced set of values/dimensions among k nearest neighbors. As an example, the system may determine that a confidence score based on 6 of 10 dimensions of the data point and its k nearest neighbors. Based on the determination, the system may calculate the confidence score based on only the 6 dimensions, and not the remaining 4 dimensions, for calculating the Euclidian distance.

In an embodiment, the system assigns weights to the values/dimensions of a data point and its k nearest neighbors. In one example, the system may review confidence scores generated for one thousand data points to determine which dimensions are most-related to accurate confidence score predictions. The system applies weights to those dimensions having a greater relationship with accurate confidence scores when computing the Euclidian distance between the data point and the k nearest neighbors.

In one embodiment, the system trains a confidence score model to generate confidence scores for predictions of a particular machine learning model. The system may generate a predicted confidence score for a particular predicted label. The system compares the predicted confidence score to known accuracy values. The system adjusts parameters of the confidence score model to tune the confidence score model. The system repeats the process of predicting a confidence score and tuning the parameters for each data point in the set of data points.

The confidence score may be used to determine whether to take action on a particular predicted label. For example, if a machine learning model generates a predicted label identifying a system state as "failure" but the confidence score is only 10%, the system may be configured to disregard the predicted label. However, if the confidence score is 80%, the system may be configured to take corrective action to avoid system failure.

A set of confidence scores may be used to determine whether to re-train a machine learning model. For example, if the system determines that the confidence scores for 80% of the last one hundred predicted labels did not meet a threshold confidence score, the system may trigger a re-training of the machine learning model to update the model based on more recently-received data.

In one embodiment, the machine learning model generates a label that classifies a target data point with a particular classification value among a set of classification values. A confidence score is generated for the particular classification, indicating a level of confidence that the particular classification for the target data point is correct.

One or more embodiments include a model agnostic confidence estimator (MACE)/system/method/algorithm that provides accurate and reliable confidence estimates for any machine learning model. The algorithm generates a confidence estimate value that explicitly accounts for both aleatoric and epistemic uncertainty, rather than the global model learnt by the point prediction model as a starting point.

In one or more embodiments, a given dataset is split into four distinct sets: (1) a standard labeled training set for the point prediction model; (2) a set of labelled data from which the confidence estimator finds the nearest neighbors for any given point; (3) a set of labelled data to optimize the parameters of the confidence estimator by minimizing the expected calibration error; (4) an unseen hold-out data used to test the model. In one embodiment, the system uses the same test data for both the confidence estimation model and the point prediction model.

In one or more embodiments, the confidence score for a predicted label is not based only on whether similar data points existed to the data point for which a machine learning model generated the predicted label. Instead, the confidence score takes into account (1) a number of nearest neighbors in a machine learning model training data set, (2) an accuracy of the nearest neighbors, and (3) a distance to the nearest neighbors.

In one or more embodiments, a system does not merely generate a confidence score for a machine learning model based on aleatoric uncertainty and epistemic uncertainty in the training data set for the model. Instead, the system trains a confidence model to generate, for a particular prediction generated by the machine learning model, a confidence value. The confidence value takes into account both aleatoric and epistemic uncertainty by factoring into the confidence value: (1) the number of nearest neighbors in a machine learning model training data set, (2) the accuracy of the nearest neighbors, and (3) the distance to the nearest neighbors.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a data analysis platform 120, a data repository 130, and a data application layer 140.

The data analysis platform 110 includes a machine learning engine 111 that trains a machine learning model 112 based on a machine learning model training subset of data 122. The machine learning model 112 is trained to receive a data point including a set of values as an input and to generate a label for the data point. The label may be referred to as a prediction. For example, if the set of values include sensor states in a system, the label generated by the machine learning model 112 may be a prediction whether the system is operational or in a failure state. The label may be a binary label, such as success/failure. Alternatively, the label may be one of a set of any number of categorizations of the data point. For example, the model may categorize a data point as corresponding to any type from "type A" through "type Z." In an embodiment in which the data point represents sensor data, example, labels may include a range of states of a system including: "optimal," "sub-optimal," "warning," and "failure."

A confidence value generator 113 trains a confidence value generating model 114 to generate confidence values for predictions made by the machine learning model 112. The confidence value generator 113 trains the confidence value model 114 to analyze individual data points for which the machine learning model 112 predicted labels. The machine learning model 112 generates predictions for data points in the graph space data subset 123 and the parameter tuning data subset 124 of the dataset 121. The confidence value generator 113 trains the confidence value model 114 by applying the machine learning model 112 to a new set of data points and identifying a relationship between the new set of data points and the data points in the graph space data subset 123. For each data point in the new set of data points, the confidence value generator 113 (a) identifies, in the graph space data subset 123, k nearest neighbors to the data point, (b) measures a distance from the data point to the k nearest neighbors in the graph space data subset 123 of data, and (c) determines whether or not the machine learning model 112 accurately predicted the labels for the k nearest neighbors. In addition, the confidence value generator 113 tunes the parameters of the confidence value model 114 to improve the accuracy of the confidence values by comparing the confidence values generated using the graph space data subset 123 with actual values in the parameter tuning data subset 124. For example, if the parameter tuning data subset 124 indicates a particular prediction for a particular data point in the new set of data points would be accurate 70% of the time, then the confidence value generator 113 tunes the model 114 by adjusting the parameter values of the model 114 so that the confidence value generated by the model 114 for the particular data point approaches 70%. The closer the confidence value generated by the model 114 is to 70%, the better calibrated is the confidence value model 114.

Upon training the machine learning model 112 and the confidence value model 114, the data analysis platform 110 may test the accuracy of the models 112 and 114 using the testing data subset 125.

The data application layer 130 includes system attributes 131 and system data 132. System attributes 131 may include, for example, attributes of one or more processors, data storage devices, network interfaces, operating systems, and applications. Some attributes may correspond to fixed values, such as a number and type of processors, a number and type of storage devices, or a number and type of applications. Other attributes vary as the system runs, including bandwidth availability, processing capacity, storage capacity, and heat generated. In one embodiment, the system attributes 131 are monitored over a predetermined period of time to generate the dataset 121 for training the machine learning model 112 and the confidence value model 114. Once the models 112 and 114 have been trained, one or more system attributes 131 may be provided to the data analysis platform 110, either in real-time or as previously-stored data. The data analysis platform 110 may convert the received system attributes 131 into a data point to provide to the trained machine learning model 112 to generate a prediction. The confidence value model 114 may then generate a confidence value for the prediction. Based on the prediction and the confidence value, the data application layer 130 determines whether to act on the prediction.

The data application layer 130 includes at least one controller 133 and one or more applications 134 and system operations 135. The applications 134 and operations 135 generate and use system data 132 to operate. In one embodiment, if the confidence value for a certain prediction indicating that a particular event is likely to occur, such as an operation failure, the controller 133 may alter the performance of one or more applications 134 or operations 135 to prevent the predicted operation failure. In the alternative, if the confidence value for the prediction does not meet a threshold value, the controller 133 may refrain from altering operations of one or more applications 134 or system operations 135 based on the prediction. In another embodiment, the data application layer 130 may display on a graphical user interface (GUI) of the user interface 136 the prediction and the confidence value. The user interface 136 may include a user-interaction element to allow a user to indicate whether to take action based on the prediction or to refrain from taking action.

In one or more embodiments, interface 136 refers to hardware and/or software configured to facilitate communications between a user and the data application layer 130. Interface 136 renders user interface elements and receives input via user interface elements. Examples of interfaces include the GUI, a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of interface 136 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 136 is specified in one or more other languages, such as Java, C, or C++.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the data analysis platform 110 or the data application layer 130. Alternatively or additionally, a data repository 104 may be implemented or executed on a computing system separate from the data analysis platform 110 or the data application layer 130. A data repository 104 may be communicatively coupled to the data analysis platform 110 or the data application layer 130 via a direct connection or via a network.

Information describing the dataset 121 may be implemented across any of components within the system 100. However, this information is illustrated within the data repository 120 for purposes of clarity and explanation.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 4, titled "Computer Networks and Cloud Networks."

In one or more embodiments, the data analysis platform 110 or the data application layer 130 refer to hardware and/or software configured to perform operations described herein for analyzing a dataset, generating a machine learning model 112, generating a confidence value model 114, and performing one or more operations based on a prediction generated by the machine learning model 112 and the confidence value associated with the prediction. Examples of operations for generating a machine learning model 112 and generating a confidence value model 114 are described below with reference to FIG. 2.

In an embodiment, the data analysis platform 110 and the data application layer 130 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Training a Confidence Score Model to Generate Confidence Scores for Machine Learning Model Predictions FIG. 2 illustrates an example set of operations for training a confidence score model to generate confidence scores for predictions made by a machine learning model in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains a dataset and trains a machine learning model using a first subset of data from the dataset (Operation 202). The system trains the machine learning model to generate a particular prediction, of a particular label, associated with a particular input data point. The first subset of data includes a plurality of data points input to the model to train the model. The system trains the machine learning model by providing, one at a time, the plurality of data points to the model, determining the predicted label output by the model, comparing the predicted label to an actual label associated with the particular data point, and adjusting parameters of the model according to whether the prediction was accurate or not.

Upon training the machine learning model, the system trains a confidence score model to generate confidence scores for predictions made by the machine learning model (Operation 204). The confidence score model takes into account aleatoric and epistemic uncertainty to generate the confidence score. The confidence score model generates a confidence score for particular individual data points for which the machine learning model generates predicted labels.

The system obtains a new set of data points for training the confidence score model (Operation 206). The new set of data points may be obtained from a second subset of data in the same dataset from which the first subset of data was obtained.

The system applies the trained machine learning model to each data point in the new set of data points to generate predicted labels for the data points (Operation 208). For example, in an embodiment in which the machine learning model is trained to generate a label predicting a system state, the machine learning model may generate a predicted label of "success" or "failure." In another embodiment in which the machine learning model is trained to classify an object in an image, the machine learning model may generate predicted labels of "person," "animal," or "automobile." In another embodiment in which the machine learning model is trained to identify a particular word, the machine learning model may generate a predicted label including the human-readable word.

The system selects a target data point from among the new set of data points (Operation 210). The system predicts a confidence score for the machine-learning-engine-predicted label (Operation 212). In one embodiment, the system predicts the confidence score using a confidence score model having variable parameters that are tuned during the training of the confidence score model.

The system identifies, in the second subset of data, k data points that are the nearest neighbors to the target data point for which the machine learning model generated the prediction (Operation 214). In one embodiment, identifying the k nearest neighbors of the target data point includes identifying k data points having the shortest Euclidian distance from the target data point. In alternative embodiments, the k nearest neighbors may be identified using principal component analysis (PCA), word2vec modeling, or any other method of measuring a distance between two data points. In addition, the confidence value generator 113 may identify the k nearest neighbors using an Approximate Nearest Neighbor (ANN) algorithm.

Figure 5:
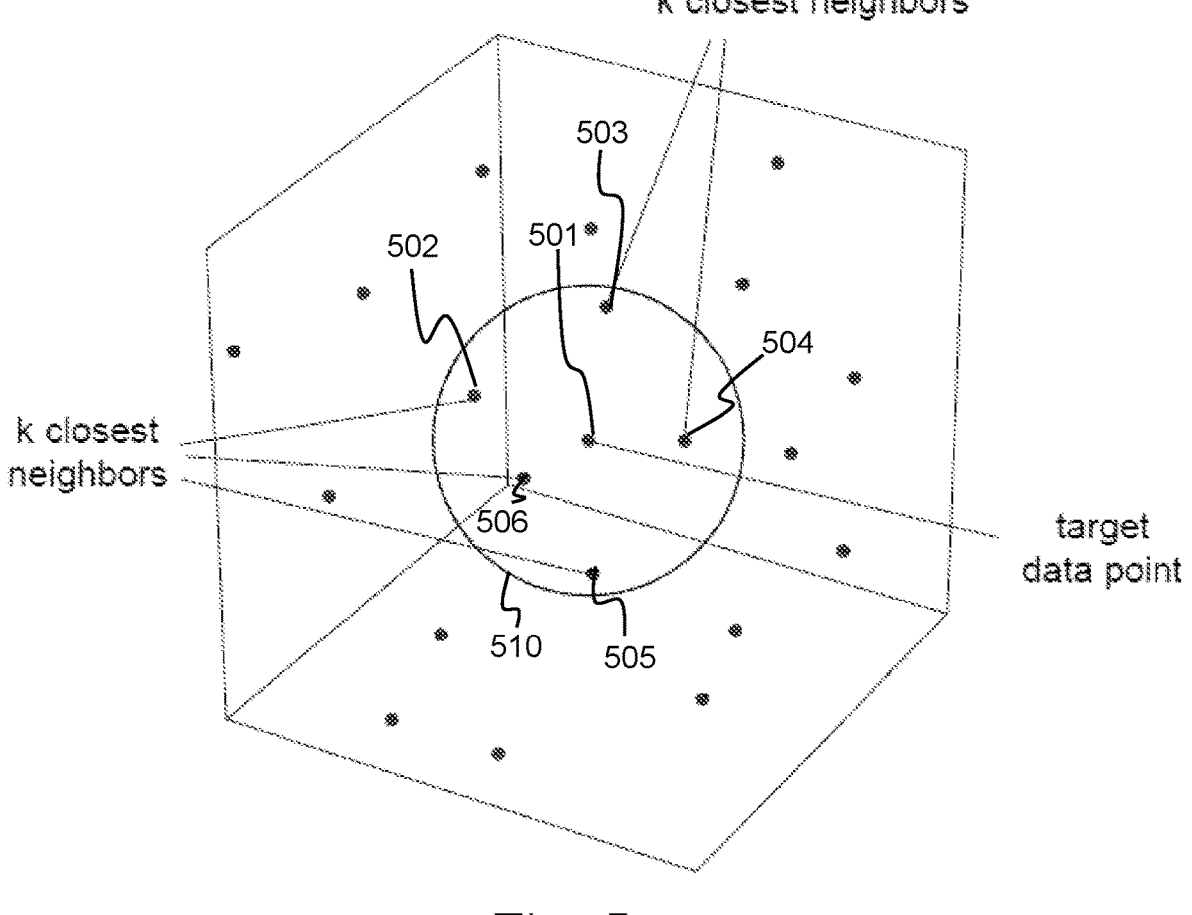
FIG. 5 illustrates an example an identification of closest neighbors in a multi-dimensional space in accordance with one or more embodiments.

FIG. 5 illustrates an example of identification of k closest neighbors in a multi-dimensional space. Referring to FIG. 5, the target data point 501 is the data point for which the machine learning model generated a predicted label and for which the confidence score model is generating a confidence score that the prediction is correct. Data points 502, 503, 504, 505, and 506 are identified as the k closest neighbors to the target data point 501. The circle 510 represents a range of values within the multi-dimensional space within which all of the data points 502-506 are located.

Figure 6:
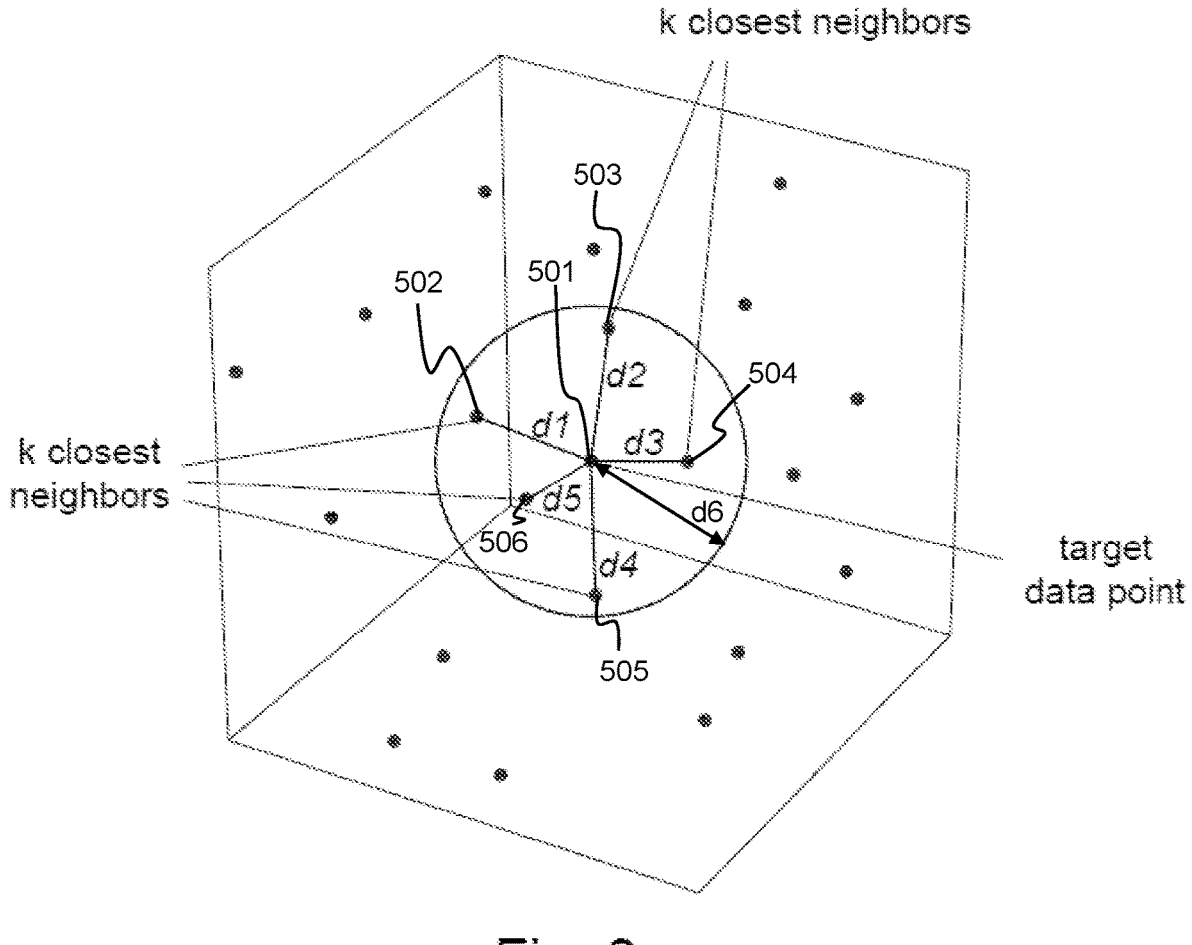
FIG. 6 illustrates an example set of identifying a distance between a target data point and closest neighbors in the multi-dimensional space in accordance with one or more embodiments.

FIG. 6 illustrates an example of identifying distances from a target point to its k closest neighbors in the multi-dimensional space. In particular, distances d1-d5 represent the Euclidian distances between the target data point 501 and the k closest neighboring data points 502-506.

In one embodiment, the system identifies the k closest neighbors by identifying k neighbors and stopping the identification once k closest neighbors are identified. For example, the confidence estimator model may be tuned to locate the ten nearest neighbors (e.g., k=10) to a particular input data point. The confidence estimator model may include each of the ten nearest neighbors in the confidence estimation model, regardless of a distance of the ten nearest neighbors from the particular input data point.

In an alternative embodiment, the system identifies the k closest neighbors by defining all the data points within a certain area as the closest neighbors. For example, referring to FIG. 6, the system may identify all data points within a pre-defined distance d6 from the target data point 501 as being the closest neighbors. For example, for one input data point in a data set, there may exist twelve data points within a distance d6 from the input data point. For this input data point, k=12. For another input data point in the data set, there may exist seven data points within a distance d6 from the data point. For this input data point, k=7.

The system identifies, for each of the k nearest neighbors, an accuracy of the machine learning prediction associated with the k nearest neighbors (Operation 216). For example, in an embodiment in which the machine learning model is trained to generate a label predicting a system state, the system may represent an incorrect prediction of the system state with a "0" and a correct prediction of the system state with a "1." In another embodiment in which the machine learning model outputs a value between 1 and 10, the system may compare the prediction of the machine learning engine to an actual value and may represent the accuracy as the difference. In such an embodiment, the accuracy of the prediction may be represented as a number between 1 and 10 (i.e., the "predicted value generated by machine learning model" minus "the actual value in data set").

The system generates a predicted confidence score for the prediction associated with the target data point (Operation 218). The predicted confidence score represents a level of confidence that the predicted label for a particular data point is accurate. The system generates the predicted confidence score based on: (a) the distance from the target data point to the k nearest neighbors in the second data set, and (b) the accuracy of the machine learning predictions associated with the k nearest neighbors.

In one embodiment, generating the confidence score includes calculating a weighted error value based on a number of the k nearest neighbors for which the machine learning model generated an incorrect prediction. A value representing the number of incorrect predictions is weighted by the distance from the particular point to the k nearest neighbors. Generating the confidence score further includes calculating a weighted distance value based on a distance from the particular point to the k nearest neighbors. The weighted distance value is weighted by the rank order of closeness to the k nearest neighbors.

In one embodiment, the confidence value model includes a particular algorithm. The algorithm may include, for example:

$$\sigma^* = \alpha\epsilon(x^*, x_k) + \beta\kappa(x^*, x_k), \qquad (1)$$

where $\sigma^*$ is the confidence score associated with a particular data point, x* represents the particular data point for which the confidence score is being generated, $\epsilon(x_k)$ represents the accuracy of the machine learning model's prediction, $\kappa(x_k)$ represents an average distance to the set of k nearest neighbors, and $\alpha$ and $\beta$ are variable parameters that are tuned by the system during training of the confidence score model.

The terms $\kappa(x^*, x_k)$ and $\epsilon(x^*, x_k)$ may be further defined as follows:

$$K(x_*, x_k) = \sum_{i=i}^{k} \frac{d(x_*, x_i)}{i} \qquad (2)$$

$$\epsilon(x_*, x_k) = \sum_{i=i}^{k} \frac{\delta_{\hat{y}_i, y_i}}{d(x_*, x_i)} \qquad (3)$$

The system compares the predicted confidence score for the predicted label associated with the target data point with an actual confidence score based on the data points in the second data set (Operation 220). For example, if the predicted confidence score is "70%" then the system determines, based on the data in the second subset of data, whether the predicted label generated by the machine learning model would be accurate 70% of the time. In one embodiment, determining whether the predicted label generated by the machine learning model would be accurate 70% of the time includes iteratively applying the machine learning model to the data set including the target data point and calculating an average of the resulting predictions generated by the machine learning model.

Based on the comparison, the system adjusts the parameters k, $\alpha$, and $\beta$ of the confidence score model (Operation 222). The system may tune the parameters k, $\alpha$, and $\beta$, of the confidence value model 114 using a third subset of the data set. For example, the system may tune the parameters k, $\alpha$, and $\beta$ for a particular data point based on: (a) identifying a certain number, k, of nearest neighbors having a greatest effect on the accuracy of the confidence value model, and (b) giving greater relative weight to the parameter $\beta$ relative to the parameter $\alpha$, based on determining that the distance from the particular data point to the k nearest neighbors had a greater effect than the accuracy of the predictions of the nearest neighbors, k, on the confidence value generated by the confidence value model. In other words, the confidence value generator adjusts the parameters k, $\alpha$, and $\beta$ relative to each other according to whether the dataset is characterized more by aleatoric or epistemic uncertainty.

For example, the machine learning engine may determine that if the parameter k is less than "5," the confidence score associated with a corresponding input data point will be too low. The machine learning model may further determine that if the parameter k is greater than "20," the computing time for computing the confidence score for data points across a target data set is higher than a specified computing time. Accordingly, the machine learning engine may tune the parameter k, associated with a number of nearest neighbors for which error values are identified, to be within a range from "6" to "19."

In one embodiment, the machine learning engine tunes the confidence score model by iteratively applying the confidence score model to the third subset of the data set. The machine learning engine may initially set the parameters $\alpha$ and $\beta$ to default values. Upon each iteration of applying the confidence score model to the third subset of the data set, the machine learning engine may adjust one or both of the parameters $\alpha$ and $\beta$ to give greater weight to (a) a distance from a particular data point to the k nearest neighbors, or (b) the accuracy of the predictions of the nearest neighbors, k. The machine learning engine adjusts the parameters $\alpha$ and $\beta$ according to whether the values in the previous iteration resulted in more accurate confidence score values or less accurate confidence score values, respectively.

3.1. Using Generated Confidence Values to Modify System Operations

FIG. 3 illustrates an example set of operations for training a confidence score model to generate confidence scores for predictions made by a machine learning model in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system obtains a new data point (Operation 302). For example, in an embodiment in which the system uses a machine learning model to identify objects in an image, the new data point may include the object to be identified in the image.

The system applies the machine learning model to generate a predicted label for the new data point (Operation 304). For example, the machine learning model may receive an image as input and output a predicted label identifying an object in the image as an automobile.

The system applies a confidence score model to the predicted label to generate a confidence score associated with the prediction (Operation 306). For example, the confidence score model may indicate that the prediction has a particular percentage likelihood of being accurate.

The system determines whether the confidence score meets a particular threshold level (Operation 308). The threshold level may be unique to each application. For example, in a system in which taking an action based on a prediction carries little risk, the system may be configured to take action when the confidence score is greater than 50%. Alternatively, in an environment in which taking action incorrectly is determined to be a greater risk than not taking action, the system may be configured to take action only when the confidence score is greater than 90%.

When the system determines that the confidence score meets the threshold, the system performs a particular operation based on the predicted label associated with the data point (Operation 310). For example, if the machine learning model predicts failure of a particular application, and the confidence score for the prediction is greater than 70%, meeting a threshold for the application, the system may save application data, assign additional resources to the application, or identify other operations or applications that may cause the application to fail. Alternatively, the system may generate a user prompt including the prediction and the confidence score associated with the prediction. The user prompt may include one or more recommended courses of action.

When the system determines that the confidence score does not meet the threshold, the system may refrain from performing a system operation based on the predicted label associated with the data point (Operation 312). For example, if the machine learning model predicts failure of a particular application, and the confidence score for the prediction is less than 70%, failing to meet a threshold for the application, the system may refrain from automatically saving application data, assigning additional resources to the application, or identify other operations or applications that may cause the application to fail. Alternatively, the system may refrain from performing automatic operations to adjust currently-running applications, but the system may generate a user prompt including the prediction and the confidence score associated with the prediction. The user prompt may include one or more recommended courses of action.

In one or more embodiments, a particular prediction and a particular confidence score meeting a threshold value may result in the system performing one or more operations automatically, without user input. The same prediction associated with a confidence score that does not meet the user threshold may result in the system refraining from performing the operations automatically. Instead, the system may display for the user the prediction and the confidence value and give the user an option to perform the actions.

In one or more embodiments, a system may rank responses to predictions in order of intrusiveness or cost to the system—such as processing resources, data storage resources, and interruption of other running processes. The system may determine which operations to perform, from lowest system cost to highest system cost, based on the confidence score associated with a particular prediction.

In one or more embodiments, the action taken by the system may depend on the combination of (a) the predicted label, and (b) the confidence score associated with the predicted label. For example, if the machine learning model predicts, based a data point of a set of input data, a system failure, but if the system has a low level of confidence in the prediction (such as below 50%), the system may take an action to obtain further data to increase the confidence score. For example, the system may identify one or more additional sensors or data sources that may combined with the previously-obtained input data to result in a prediction having a confidence score of 70% or greater.

Alternatively, if the machine learning model generates, based on a data point of a set of input data, a prediction that a particular component will experience delays, and if the confidence score associated with the component is below 50%, the system may determine that the prediction does not merit taking remedial action or obtaining additional input data. For example, the system may have a pre-defined set of rules defining (a) a prediction associated with a component, (b) confidence scores associated with the predictions, and (c) actions to be taken for different combinations of predictions, components, and confidence scores.

3.2. Using Generated Confidence Values to Trigger Re-Training of Model

FIG. 4 illustrates an example set of operations for triggering a re-training of a machine learning model based on confidence scores of the predictions of the machine learning model in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system generates confidence scores for a plurality of predictions made by a machine learning model corresponding to a plurality of data points (Operation 402). For example, the system may monitor sensor data for a given period of time—such as a week—and generate data points corresponding to the combined sensor data at regular intervals over the course of the week. The machine learning model is applied to the data points to generate, for each of the data points, a predicted label. The system generates a confidence score for each particular label, indicating a level of confidence that the predicted label is accurate.

The system identifies a number, n, of the plurality of data points for which the confidence score of an associated predicted label meets a threshold confidence value (Operation 404). For example, the system may set a threshold confidence value at 70%. The system may determine, from among the plurality of data points, how many are associated with predictions having a confidence score of at least 70%. In one embodiment, the number, n, is associated with a percentage. For example, the system may apply a rule specifying n=80%. For a data set including 1,000 data points, the system would determine whether 80%, or 800, of the 1,000 data points have confidence scores above 70%.

The system determines whether the calculated percentage of data points having a confidence score above the pre-defined value exceeds a threshold percentage (Operation 406). For example, the system may determine that if less than 50% of the predictions made by a machine learning model are determined to have a confidence score meeting a threshold confidence value, the machine learning model should be re-trained with new data. Alternatively, in a system requiring high precision, the system may determine that the threshold percentage is 90%. Accordingly, the system may take corrective action if the system determines that fewer than 90% of the predictions made by the machine learning model meet a threshold confidence level.

If the system determines that the calculated percentage of data points meets the threshold percentage, the system refrains from re-training the machine learning model (Operation 408). In one or more embodiments, the system may perform additional actions, such as displaying a calculated percentage and recommended actions when a percentage approaches the threshold percentage.

If the system determines that the calculated percentage of data points does not meet the threshold percentage, the system may trigger re-training of the machine learning model with a new dataset to improve the accuracy of the predictions made by the machine learning model (Operation 410). In one embodiment, the system may identify, based on the parameters used to generate the confidence scores, particular types of data that should be provided to improve the accuracy of the machine learning model. For example, the system may identify the lack of particular data as resulting in low confidence scores for particular predictions. The system may display recommended types of data for the new training data set.

4. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
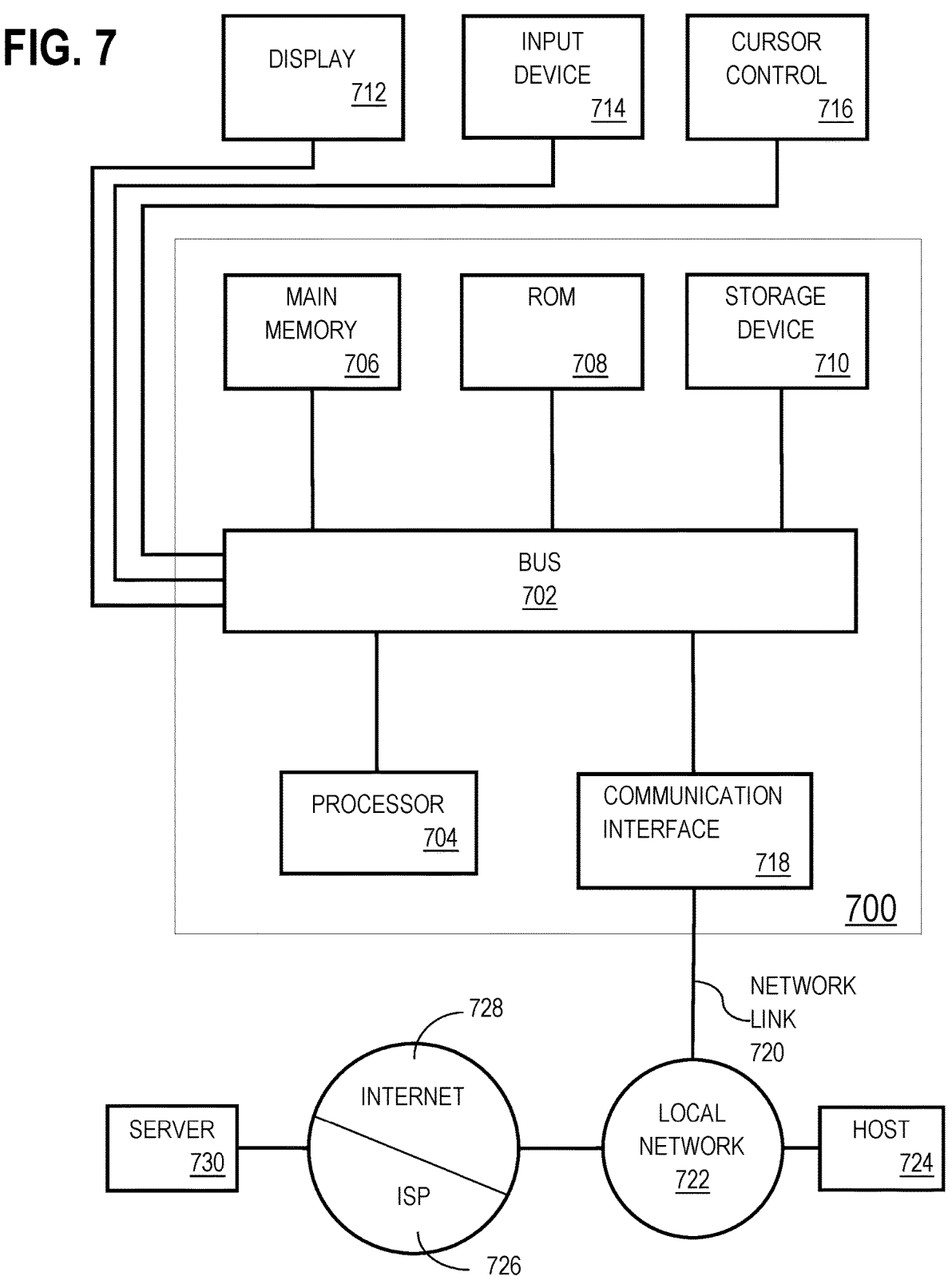
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

obtaining, by a data analysis platform executing on a computer comprising the one or more hardware processors, a dataset including (a) a plurality of data points in a multidimensional space comprising three or more dimensions, the plurality of data points corresponding to a respective plurality of system operations, and (b) a plurality of labels corresponding respective to the plurality of data points, the plurality of labels corresponding to success or failure of the respective plurality of system operations;

training, by a machine learning engine of the data analysis platform using a first subset of the dataset, a machine learning model to predict success or failure of target system operations represented by respective target data points in the multidimensional space;

executing, by the data analysis platform, a performance-based retraining of the machine learning model at least by:

accessing a first set of system operation data corresponding to a first system operation;

generating, based on the first set of system operation data, a first target data point in the multidimensional space, the first target data point comprising values corresponding to the three or more dimensions in the multidimensional space;

inputting the first target data point into the machine learning model to generate a first predicted-value representing success or failure of the first system operation corresponding to the first target data point;

determining a first confidence score for the first predicted value at least by:

identifying a first subset of the plurality of data points in the multidimensional space corresponding to a second subset of the dataset;

identifying a first set of k data points, from the first subset of the plurality of data points, closest to the first target data point;

responsive to identifying the first set of k data points as being closest to the first target data point: inputting each of the first set of k data points into the machine learning model to predict a first set of k values, the first set of k data points corresponding respectively to a first set of known labels indicating success or failure;

determining a first neighbor accuracy value for the machine learning model based on:

(a) determining whether each of the first set of k predicted values was a correct prediction or an incorrect prediction by comparing the first set of k predicted values to the first set of known labels for the first set of k data points, wherein determining whether each of the first set of k predicted values was a correct prediction or an incorrect prediction corresponds to a first level of aleatoric uncertainty associated with the dataset for training the machine learning model; and (b) determining a first distance of each of the first set of k data points to the first target data point in the multidimensional space, wherein determining the first distance of each of the first set of k data points to the first target data point corresponds to a second level of epistemic uncertainty associated with the dataset for training the machine learning model; and computing the first confidence score for the first predicted value based at least on the first neighbor accuracy value;

calculating, by the data analysis platform, a plurality of confidence scores associated with a plurality of target data points;

calculating, by the data analysis platform, a percentage of the plurality of confidence scores that meet a threshold confidence score value; and determining that the percentage of the plurality of confidence scores that meet the threshold confidence score value does not meet a threshold percentage; and executing, by the data analysis platform, a retraining process for retraining the machine learning model.

2. The non-transitory computer readable medium of claim 1, wherein determining the first neighbor accuracy value includes computing an average distance based on the first distance of each of the first set of k data points to the first target data point, wherein the first confidence score is computed based on the average distance.

3. The non-transitory computer readable medium of claim 2, further comprising:

training a confidence score model to generate confidence scores for predicted values generated by the machine learning model, wherein training the confidence score model comprises:

comparing the first confidence score for the first predicted value to an actual score calculated from a third subset of the dataset; and adjusting one or more parameters to increase an accuracy of the first confidence score, the one or more parameters including: (a) a first parameter, k, representing a number of data points closest to the first target data point; (b) a second parameter representing a first weight applied to a distance of each of the k data points to the first target data point; and (c) a third parameter representing a second weight applied to a value indicating whether each of the k predicted values was a correct prediction or an incorrect prediction.

4. The non-transitory computer readable medium of claim 1, wherein the first confidence score is computed based on a weighted average of an accuracy score each of k predicted values, wherein a weight for the first neighbor accuracy value for each particular predicted value is based on distance of a corresponding data point from first target data point.

5. The non-transitory computer readable medium of claim 1, wherein the operations further comprise:

determining the first predicted value corresponds to a prediction of failure of the first system operation; and based on determining (a) the first predicted value corresponds to the prediction of failure and (b) the first confidence score meets a first threshold: using the first predicted value to modify an execution of the first system operation by a controller;

generating a second set of system operation data corresponding to a second system operation;

generating, based on the second set of system operation data, a second target data point;

applying the machine learning model to the second target data point in the multidimensional space to generate a second predicted value for the second target data point;

determining a second confidence score for the second predicted value;

determining whether the second confidence score meets the first threshold; and based on determining (a) the second predicted value corresponds to a prediction of failure of the second system operation and (b) the second confidence score does meet the first threshold:

refraining from using the second predicted value to modify the execution of the second system operation by the controller.

6. The non-transitory computer readable medium of claim 1, wherein the operations further comprise:

identifying additional data describing a computing system for updating the dataset, the computing system corresponding to the plurality of system operations; and generating a new dataset including the additional data describing the computing system, wherein retraining the machine learning model is performed using the new dataset including the additional data.

7. The non-transitory computer readable medium of claim 6, wherein identifying the additional data describing the system comprises identifying a set of sensors that monitor the computing system to generate the additional data, wherein the operations further comprise:

obtaining the additional data generated by the set of sensors;

generating the new dataset using the additional data generated by the set of sensors; and retraining the machine learning model using the new dataset.

8. The medium of claim 1, wherein the operations further comprise:

applying a first weight to a first parameter, a, associated with the determining whether each of the first set of k predicted values was a correct prediction;

applying a second weight to a second parameter, b, associated with the determining the first distance of each of the first set of k data points to the first target data point;

applying a third weight to a third parameter, k, associated with determining a number of data points closest to the first target data point; and tuning at least one of the first parameter, the second parameter, and the third parameter based on comparing the first confidence score for the first predicted value to an actual score obtained from a third subset of the dataset, wherein tuning the at least one of the first parameter, the second parameter, and the third parameter includes modifying a value of at least one of k, a, and b.

9. The medium of claim 1, wherein the first confidence score has an inverse relationship with a first combination of (a) the first level of aleatoric uncertainty and (b) the second level of epistemic uncertainty associated with the dataset for training the machine learning model.

10. The medium of claim 1, wherein the operations further comprise:

applying the machine learning model to a second target data point in the multidimensional space to generate a second predicted value for the second target data point;

determining a second confidence score for the second predicted value at least by:

identifying a second subset of the plurality of data points in the multidimensional space corresponding to a second subset of the dataset;

identifying a second set of k data points, from the second subset of the plurality of data points, closest to the second target data point;

applying the machine learning model to each of the second set of k data points to predict a second set of k values;

determining a second neighbor accuracy value for the machine learning model based on:

(a) determining whether each of the second set of k predicted values was a correct prediction or an incorrect prediction by comparing the second set of k predicted values to a second set of known labels for the second set of k data points, wherein determining whether each of the second set of k predicted values was a correct prediction or an incorrect prediction corresponds to a third level of aleatoric uncertainty associated with the dataset for training the machine learning model; and (b) determining a second distance of each of the second set of k data points to the second target data point in the multidimensional space, wherein determining the second distance of each of the second set of k data points to the second target data point corresponds to a fourth level of epistemic uncertainty associated with the dataset for training the machine learning model; and computing the second confidence score for the second predicted value based at least on the second neighbor accuracy value, wherein the second confidence score is less than the first confidence score, based on at least one of (a) the first level of aleatoric uncertainty being greater than the second level of aleatoric uncertainty and (b) the second level of epistemic uncertainty being greater than the fourth level of epistemic uncertainty.

11. The non-transitory computer readable medium of claim 1, wherein the plurality of data points comprise values in three or more dimensions of the multidimensional space.

12. A method comprising:

obtaining, by a data analysis platform executing on a computer comprising the one or more hardware processors, a dataset including (a) a plurality of data points in a multidimensional space comprising three or more dimensions, the plurality of data points corresponding to a respective plurality of system operations, and (b) a plurality of labels corresponding respective to the plurality of data points, the plurality of labels corresponding to success or failure of the respective plurality of system operations;

training, by a machine learning engine of the data analysis platform using a first subset of the dataset, a machine learning model to predict success or failure of target system operations represented by respective target data points in the multidimensional space;

executing, by the data analysis platform, a performance-based retraining of the machine learning model at least by:

accessing a first set of system operation data corresponding to a first system operation;

generating, based on the first set of system operation data, a first target data point in the multidimensional space, the first target data point comprising values corresponding to the three or more dimensions in the multidimensional space;

inputting the first target data point into the machine learning model to generate a first predicted-value representing success or failure of the first system operation corresponding to the first target data point;

determining a first confidence score for the first predicted value at least by:

identifying a first subset of the plurality of data points in the multidimensional space corresponding to a second subset of the dataset;

identifying a first set of k data points, from the first subset of the plurality of data points, closest to the first target data point;

responsive to identifying the first set of k data points as being closest to the first target data point:

inputting each of the first set of k data points into the machine learning model to predict a first set of k values, the first set of k data points corresponding respectively to a first set of known labels indicating success or failure;

determining a first neighbor accuracy value for the machine learning model based on:

(a) determining whether each of the first set of k predicted values was a correct prediction or an incorrect prediction by comparing the first set of k predicted values to the first set of known labels for the first set of k data points, wherein determining whether each of the first set of k predicted values was a correct prediction or an incorrect prediction corresponds to a first level of aleatoric uncertainty associated with the dataset for training the machine learning model; and (b) determining a first distance of each of the first set of k data points to the first target data point in the multidimensional space, wherein determining the first distance of each of the first set of k data points to the first target data point corresponds to a second level of epistemic uncertainty associated with the dataset for training the machine learning model; and computing the first confidence score for the first predicted value based at least on the first neighbor accuracy value;

calculating, by the data analysis platform, a plurality of confidence scores associated with a plurality of target data points;

calculating, by the data analysis platform, a percentage of the plurality of confidence scores that meet a threshold confidence score value; and determining that the percentage of the plurality of confidence scores that meet the threshold confidence score value does not meet a threshold percentage; and executing, by the data analysis platform, a retraining process for retraining the machine learning model.

13. The method of claim 12, wherein determining the first neighbor accuracy value includes computing an average distance based on the first distance of each of the first set of k data points to the first target data point, wherein the first confidence score is computed based on the average distance.

14. The method of claim 13, further comprising:

training a confidence score model to generate confidence scores for predicted values generated by the machine learning model, wherein training the confidence score model comprises:

comparing the first confidence score for the first predicted value to an actual score calculated from a third subset of the dataset; and adjusting one or more parameters to increase an accuracy of the first confidence score, the one or more parameters including: (a) a first parameter, k, representing a number of data points closest to the first target data point; (b) a second parameter representing a first weight applied to a distance of each of the k data points to the first target data point; and (c) a third parameter representing a second weight applied to a value indicating whether each of the k predicted values was a correct prediction or an incorrect prediction.

15. The method of claim 12, wherein the first confidence score is computed based on a weighted average of an accuracy score each of k predicted values, wherein a weight for the first neighbor accuracy value for each particular predicted value is based on distance of a corresponding data point from first target data point.

16. The method of claim 12, further comprising:

determining the first predicted value corresponds to a prediction of failure of the first system operation; and based on determining (a) the first predicted value corresponds to the prediction of failure and (b) the first confidence score meets a first threshold: using the first predicted value to modify an execution of the first system operation by a controller;

generating a second set of system operation data corresponding to a second system operation;

generating, based on the second set of system operation data, a second target data point;

applying the machine learning model to the second target data point in the multidimensional space to generate a second predicted value for the second target data point;

determining a second confidence score for the second predicted value;

determining whether the second confidence score meets the first threshold; and based on determining (a) the second predicted value corresponds to a prediction of failure of the second system operation and (b) the second confidence score does meet the first threshold:

refraining from using the second predicted value to modify the execution of the second system operation by the controller.

17. The method of claim 12, further comprising:

identifying additional data describing a computing system for updating the dataset, the computing system corresponding to the plurality of system operations; and generating a new dataset including the additional data describing the computing system, wherein retraining the machine learning model is performed using the new dataset including the additional data.

18. A system, comprising:

one or more processors; and memory storing instructions that, when executed by the one or more processors, cause the system to perform operations comprising:

obtaining, by a data analysis platform executing on a computer comprising the one or more hardware processors, a dataset including (a) a plurality of data points in a multidimensional space comprising three or more dimensions, the plurality of data points corresponding to a respective plurality of system operations, and (b) a plurality of labels corresponding respective to the plurality of data points, the plurality of labels corresponding to success or failure of the respective plurality of system operations;

training, by a machine learning engine of the data analysis platform using a first subset of the dataset, a machine learning model to predict success or failure of target system operations represented by respective target data points in the multidimensional space;

executing, by the data analysis platform, a performance-based retraining of the machine learning model at least by:

accessing a first set of system operation data corresponding to a first system operation;

generating, based on the first set of system operation data, a first target data point in the multidimensional space, the first target data point comprising values corresponding to the three or more dimensions in the multidimensional space;

inputting the first target data point into the machine learning model to generate a first predicted-value representing success or failure of the first system operation corresponding to the first target data point;

determining a first confidence score for the first predicted value at least by:

identifying a first subset of the plurality of data points in the multidimensional space corresponding to a second subset of the dataset;

identifying a first set of k data points, from the first subset of the plurality of data points, closest to the first target data point;

responsive to identifying the first set of k data points as being closest to the first target data point: inputting each of the first set of k data points into the machine learning model to predict a first set of k values, the first set of k data points corresponding respectively to a first set of known labels indicating success or failure;

determining a first neighbor accuracy value for the machine learning model based on:

(a) determining whether each of the first set of k predicted values was a correct prediction or an incorrect prediction by comparing the first set of k predicted values to the first set of known labels for the first set of k data points, wherein determining whether each of the first set of k predicted values was a correct prediction or an incorrect prediction corresponds to a first level of aleatoric uncertainty associated with the dataset for training the machine learning model; and (b) determining a first distance of each of the first set of k data points to the first target data point in the multidimensional space, wherein determining the first distance of each of the first set of k data points to the first target data point corresponds to a second level of epistemic uncertainty associated with the dataset for training the machine learning model; and computing the first confidence score for the first predicted value based at least on the first neighbor accuracy value;

calculating, by the data analysis platform, a plurality of confidence scores associated with a plurality of target data points;

calculating, by the data analysis platform, a percentage of the plurality of confidence scores that meet a threshold confidence score value; and determining that the percentage of the plurality of confidence scores that meet the threshold confidence score value does not meet a threshold percentage; and executing, by the data analysis platform, a retraining process for retraining the machine learning model.

19. The system of claim 18, wherein determining the first neighbor accuracy value includes computing an average distance based on the first distance of each of the first set of k data points to the first target data point, wherein the first confidence score is computed based on the average distance.

20. The system of claim 19, the instructions further causing the system to perform:

training a confidence score model to generate confidence scores for predicted values generated by the machine learning model, wherein training the confidence score model comprises:

comparing the first confidence score for the first predicted value to an actual score calculated from a third subset of the dataset; and adjusting one or more parameters to increase an accuracy of the first confidence score, the one or more parameters including: (a) a first parameter, k, representing a number of data points closest to the first target data point; (b) a second parameter representing a first weight applied to a distance of each of the k data points to the first target data point; and (c) a third parameter representing a second weight applied to a value indicating whether each of the k predicted values was a correct prediction or an incorrect prediction.

21. The system of claim 18, wherein the first confidence score is computed based on a weighted average of an accuracy score each of k predicted values, wherein a weight for the first neighbor accuracy value for each particular predicted value is based on distance of a corresponding data point from first target data point.

22. The system of claim 18, wherein the operations further comprise:

determining the first predicted value corresponds to a prediction of failure of the first system operation; and based on determining (a) the first predicted value corresponds to the prediction of failure and (b) the first confidence score meets a first threshold: using the first predicted value to modify an execution of the first system operation by a controller;

generating a second set of system operation data corresponding to a second system operation;

generating, based on the second set of system operation data, a second target data point;

applying the machine learning model to the second target data point in the multidimensional space to generate a second predicted value for the second target data point;

determining a second confidence score for the second predicted value;

determining whether the second confidence score meets the first threshold; and based on determining (a) the second predicted value corresponds to a prediction of failure of the second system operation and (b) the second confidence score does meet the first threshold:

refraining from using the second predicted value to modify the execution of the second system operation by the controller.

23. The system of claim 18, wherein the operations further comprise:

identifying additional data describing a computing system for updating the dataset, the computing system corresponding to the plurality of system operations; and generating a new dataset including the additional data describing the computing system, wherein retraining the machine learning model is performed using the new dataset including the additional data.

* * * * *